C. Rich,
Bed Spring
No. 106,980. Patented Aug. 30, 1870.
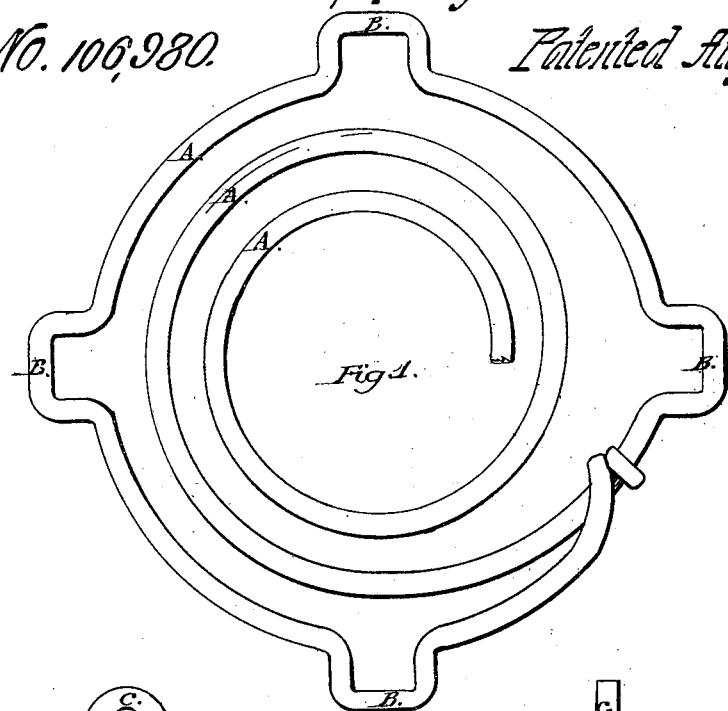
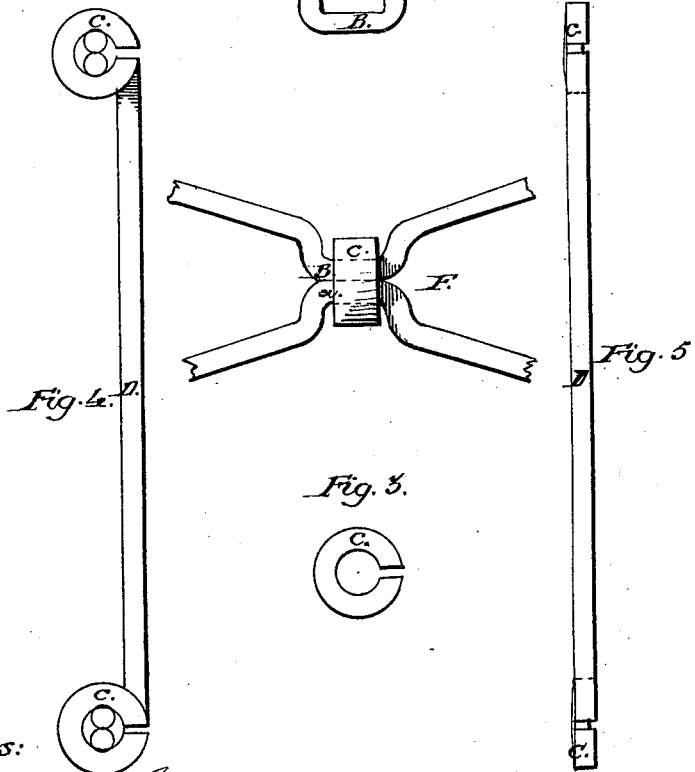
Witnesses:
James H. Cronk
Abm. W. Irish
Inventor:
Charles Rich

UNITED STATES PATENT OFFICE.

CHARLES RICH, OF POUGHKEEPSIE, NEW YORK, ASSIGNOR TO HIMSELF, AND DAVID S. MALLORY, OF SAME PLACE.

IMPROVED SPRING FOR BEDS.

Specification forming part of Letters Patent No. 106,980, dated August 30, 1870.

*To all whom it may concern:*

Be it known that I, CHARLES RICH, of Poughkeepsie, in the county of Dutchess and State of New York, have invented a new and Improved Mode of Constructing Spring-Beds; and I do hereby declare that the following is a full, clear, and exact description thereof, which will enable others skilled in the art to make and use the same, reference being had to the accompanying drawings, forming part of this specification, in which—

Figure 1 represents a vertical section plan view of my improved spring. Fig. 2 is a vertical section view of two springs connected by a sleeve. Fig. 3 is a side elevation view of the sleeve shown in Fig. 2. Fig. 4 is a side elevation view of two sleeves connected to each other by a rod or reach of sufficient length to span the last coil of a spring from bearing to bearing. Fig. 5 is a vertical section view of the drawing Fig. 4.

Similar letters of reference indicate corresponding parts.

The object of this invention is to construct a spring-bed so that, with a simple apparatus, the spiral springs now in common use for upholstering can be set in proper position and secured without the use of slats, cord, lacing, or boxing, or a frame of any kind, and so that the spring-bed may be used either side up, or rolled up into small compass for shipping, and also to prevent the possibility of leaving a harbor for bugs.

The invention consists, first, in placing collars upon or in bending or shaping the last coil on each end of the springs, so as to form four straight bearings at equal distance from each other and at right angles, with suitable shoulders or collars at each end of said bearings to prevent the sleeves or ferrules for connecting the springs together from becoming displaced, and so that the springs shall be held firmly in their proper places or positions to each other.

The invention consists, second, in connecting the springs together by means of sleeves or ferrules at the said bearings, inclosing the bearings of two springs by pairs in each sleeve, as shown.

A A A in the drawings represent a section of my improved bed-spring; B B B B, the bearings for connecting the springs to each other. These bearings are placed upon a circle at equal distance from each other, some larger than the circle formed by the last coil of the spring, which is done by bending the wire, as shown, and thereby forming shoulders or guards at the ends of the two bearings.

C is the sleeve or ferrule used for connecting the springs together. This sleeve may be made of a flat piece of metal of suitable width to cover the length of the bearings upon the springs and long enough to inclose two bearings when bent into the form of a ring, as shown, around them, or any other suitable material may be used for connecting the bearings of the springs together equivalent to the sleeve, as shown; or the sleeves may be made of a length sufficient to cover half the length of the bearings, and connected together in pairs by a rod or reach, which said rod or reach has formed upon each end thereof the sleeves $c$, constructed in such a manner as to be easily attached to the collars or bearings of the upper and lower coils of the springs, of a length sufficient to span the top of each spring, as shown, Figs. 4 and 5. D is the rod or reach for connecting the sleeves C together.

Having thus described my invention, what I claim as new, and desire to secure by Letters Patent, is—

1. The construction and arrangement of the collars or bearings B B B upon the upper and lower coils of the spiral springs, in the manner and for the purpose herein described.

2. The construction and arrangement of the rods D D, having formed upon their ends the sleeves C C, in combination with the coiled spring A A, when combined in the manner and for the purpose herein described.

CHARLES RICH.

Witnesses:
JAMES H. CRONK,
ABM. W. IRISH.